April 19, 1932.   C. L. POST   1,854,221
FEEDING MECHANISM
Original Filed Jan. 14, 1926   5 Sheets-Sheet 1

Fig. 1.

Witness
William P. Kilroy

Inventor
Claude L. Post
By Hill & Hill
Attys.

April 19, 1932. C. L. POST 1,854,221
FEEDING MECHANISM
Original Filed Jan. 14, 1926 5 Sheets-Sheet 3

Witness
William P. Kilroy

Inventor
Claude L. Post
By Hill & Hill
Attys

April 19, 1932.    C. L. POST    1,854,221
FEEDING MECHANISM
Original Filed Jan. 14, 1926    5 Sheets-Sheet 4

Witness
William P. Kilroy

Inventor
Claude L. Post
By Hill & Hill
Atty.

April 19, 1932.    C. L. POST    1,854,221
FEEDING MECHANISM
Original Filed Jan. 14, 1926    5 Sheets-Sheet 5
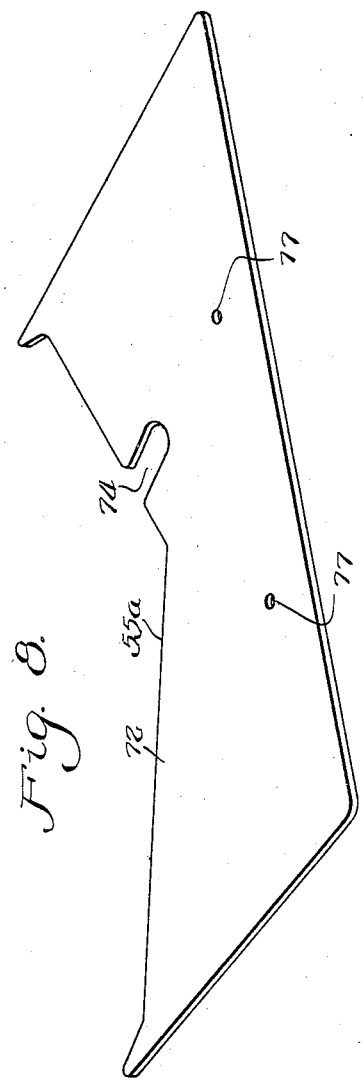
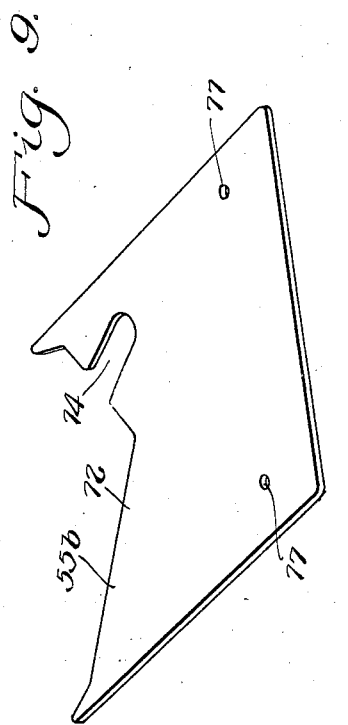
Inventor
Claude L. Post
Witness    By    Hill & Hill
Attys.

Patented Apr. 19, 1932

1,854,221

UNITED STATES PATENT OFFICE

CLAUDE L. POST, OF CHICAGO, ILLINOIS

FEEDING MECHANISM

Original application filed January 14, 1926, Serial No. 81,204, now Patent No. 1,730,477. Divided and this application filed May 22, 1929. Serial No. 365,037.

This application is a division of my copending application, Serial No. 81,204, filed January 14th, 1926.

My invention relates to feeding mechanism and particularly to mechanism for feeding envelopes to printing mechanism or the equivalent.

The invention has among its objects the production of mechanism of the kind described, which is convenient, compact, durable, efficient and satisfactory for use whenever found applicable.

A particular object of the invention is to provide improved mechanism for feeding envelopes from a magazine.

Another particular object of the invention is to provide improved mechanism which can be quickly and easily adjusted to feed various sized envelopes to printing mechanisms, or the equivalent.

Still another object of my invention is to provide a device of the type referred to which will include means for automatically extending the flap of an envelope as it is being fed from the magazine, this flap extending mechanism being adjustable in order to accommodate various sizes of envelopes.

One form of the invention is embodied in a machine particularly adapted to print addresses or other information upon envelopes, the machine comprising printing mechanism to which the envelopes are fed by my improved feeding mechanism. My improved feeding mechanism preferably comprises feeding rolls, or the equivalent, and a magazine which is adjustable with respect to the feeding rolls, the envelopes being fed from the magazine to the feeding rolls by means which may be quickly and easily adjusted for various sized envelopes, or envelopes having various sized flaps.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a fragmentary side elevation of a printing machine embodying the invention;

Figs. 8 and 9 are perspective views of envelope supporting plates which may be used in place of the envelope supporting plate shown in Figs. 2 and 3 to accommodate different sized envelopes.

Figure 2:
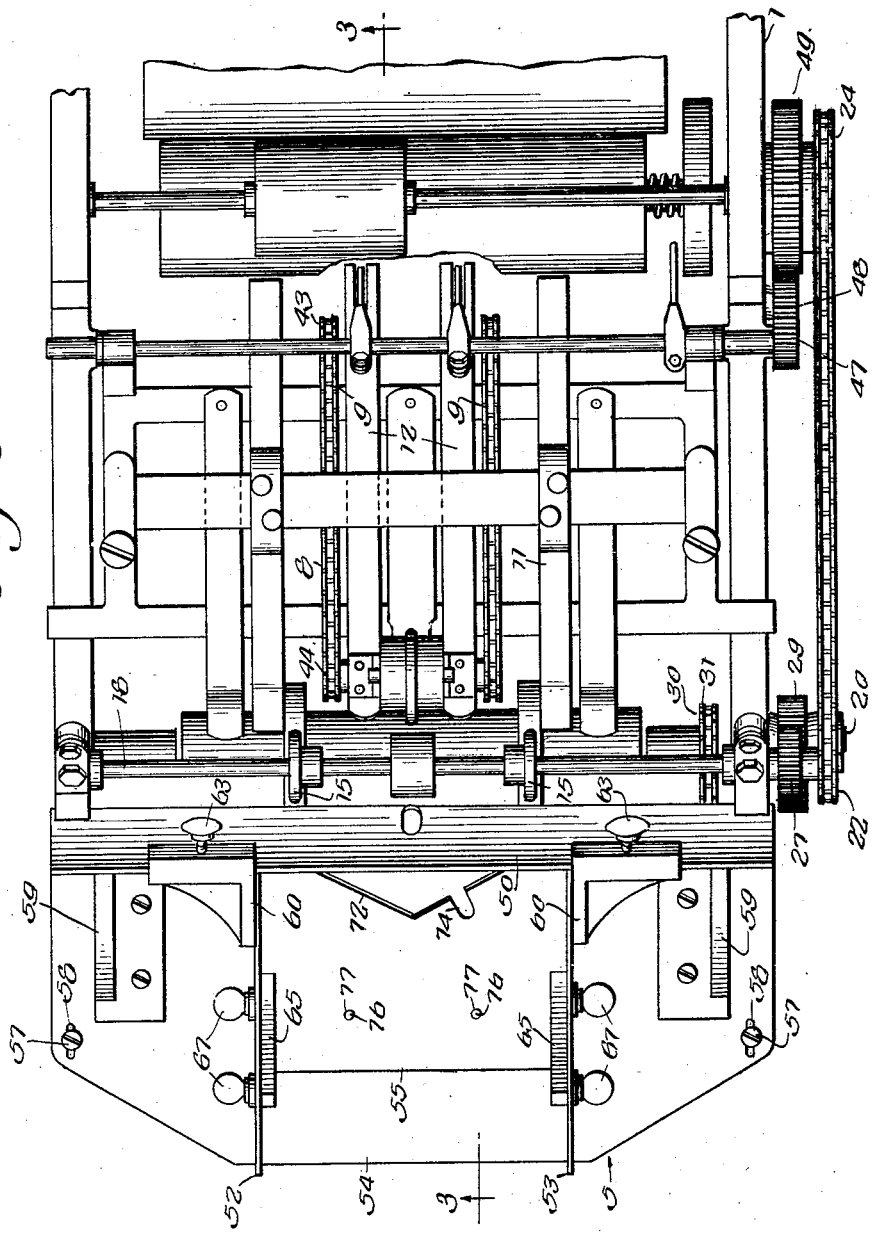
Fig. 2 is a fragmentary plan view of the machine shown in Fig. 1.

Referring to the drawings in which a preferred form of the invention is shown embodied in a machine particularly adapted to print return addresses and the like upon envelopes, and also adapted to print any desired information upon cards or sheets of paper, the reference character 1 designates generally a main frame portion and the reference characters 2 and 3 designate a printing roll and a platen or impression roll, respectively, the rolls being driven by means (not shown) shown and described in my co-pending application, Serial No. 741,428 filed October 3, 1924. The envelopes or other articles to be printed are preferably placed in a hopper or magazine 5 located at one end of the machine and are withdrawn therefrom and then presented to the printing roll 2, envelopes being withdrawn from the magazine by means comprising feed rolls 15 and 16 mounted in the frame 1 and a flap engaging finger 14 mounted below the magazine and adapted to extend the flap portions of the envelopes forwardly. The flap engaging finger is adapted to engage the body portion of the lowermost envelope in the magazine behind the flap portion thereof and then swinging the flap in advance of the body portion in such manner that the flap may be engaged by the feed rolls 15 and 16. This is advantageous in that the envelopes are then presented to the printing roll with their flap portions extended and it is then relatively easy to make clear impressions of the type upon the envelopes. Means comprising sprocket chains 8 is provided for advancing the envelopes from the feed rolls 15 and 16 to the printing roll 2, the sprocket chains being provided with lugs 9 adapted to engage the envelopes and to push them through a plurality of U-shaped guides 11 and a plurality of flat guides 12.

Figure 3:
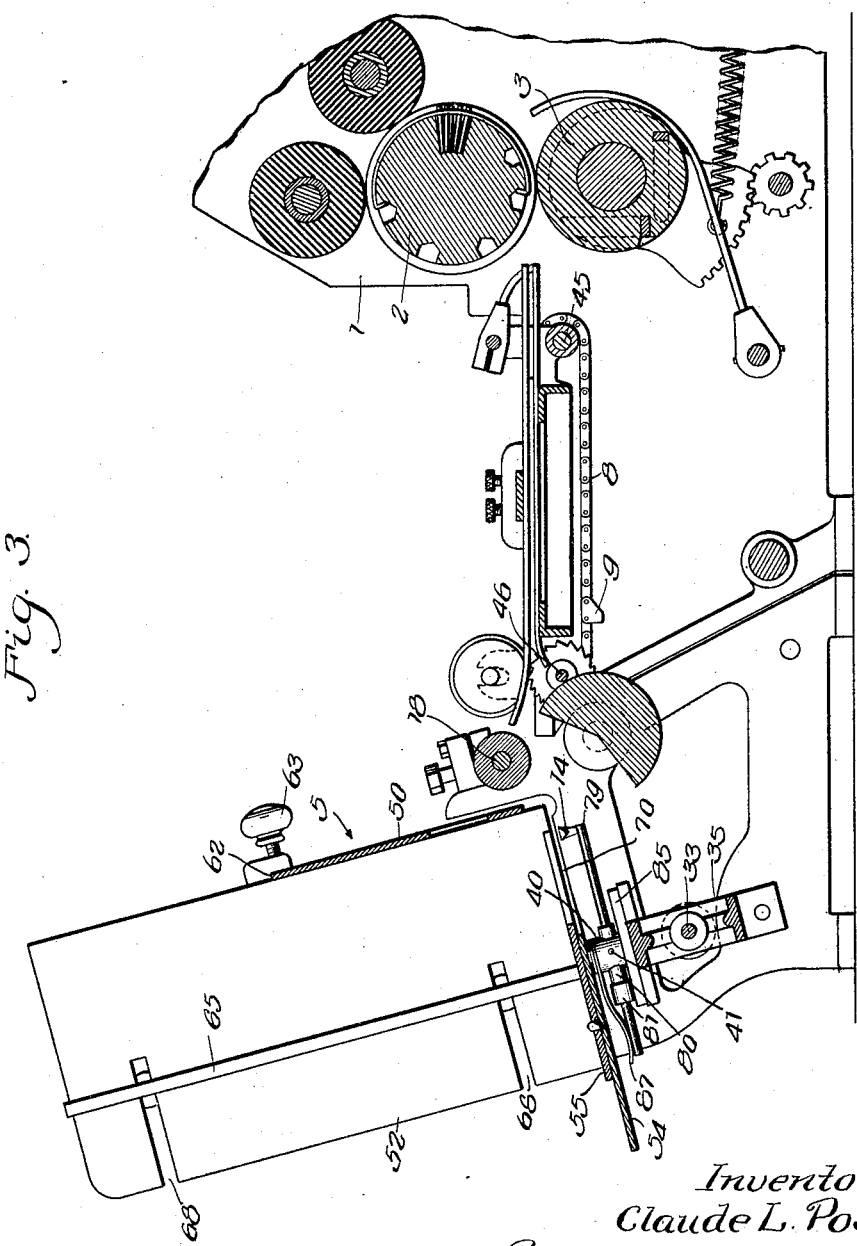
Fig. 3 is a section taken on line 3—3 of Fig. 2.
Figure 4:
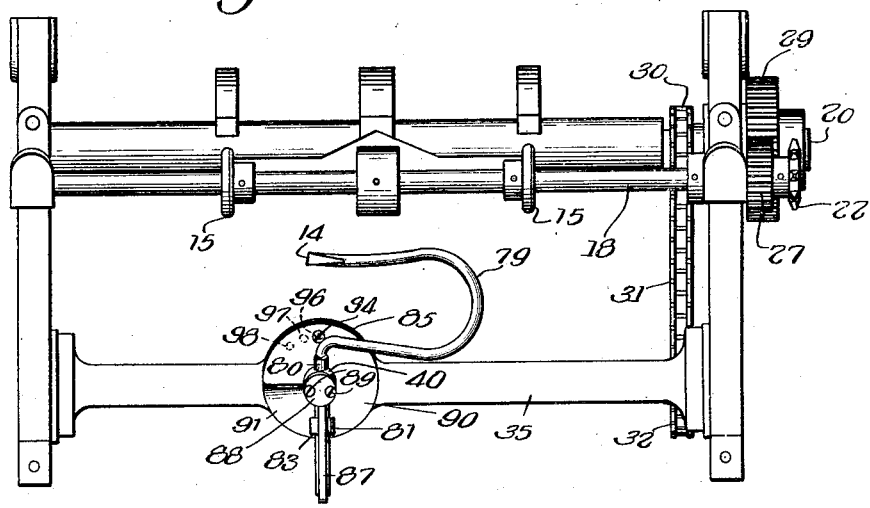
Fig. 4 is a plan elevation of the mechanism adapted to extend the flaps of the envelopes.
Figure 5:
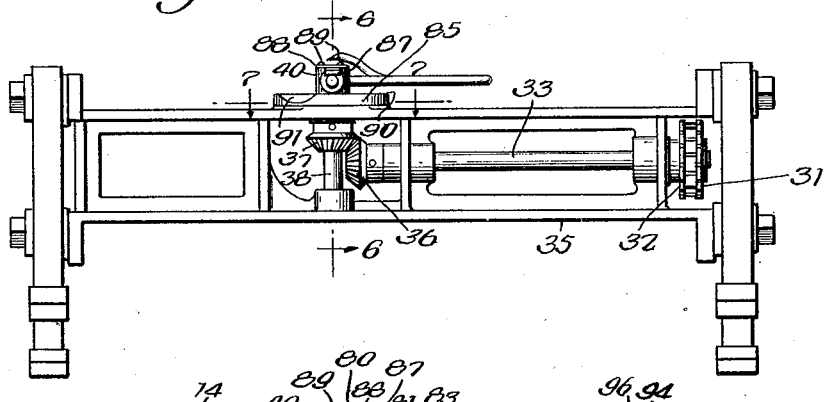
Fig. 5 is a front elevation of the mechanism adapted to extend the flaps of the envelopes.
Figure 6:
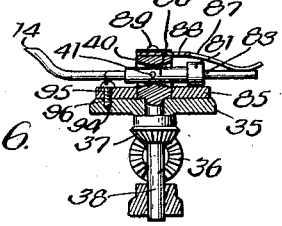
Fig. 6 is a section taken on line 6—6 of Fig. 5.
Figure 7:
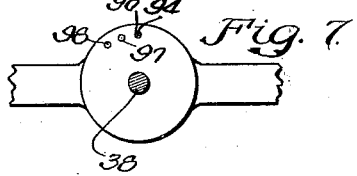
Fig. 7 is a section taken on line 7—7 of Fig. 5.

Any suitable means may be provided for driving the flap engaging finger 14, the feed rolls 15 and 16, and the sprocket chains 8. It will be noted that in the illustrated embodiment of the invention, the feed rolls 15 are secured to a shaft 18 rotatably journaled in the frame 1 and that the feed roll 16 is provided with trunnions 20 rotatably journaled in the frame 1. Meshing with a sprocket 22 fixed to the shaft 18 is a sprocket chain 23 which meshes with a sprocket 24 fixed to a shaft 25 carrying the printing roller 2, it being understood that the shaft 25 is driven by means (not shown) hereinbefore mentioned. A pinion 27 secured to the shaft 18 meshes with a gear 29 secured to one of the trunnions 20. Fixed to the same trunnion 20 is a sprocket 30 which meshes with a sprocket chain 31 arranged to mesh with a sprocket 32 secured to a shaft 33, the shaft 33 being rotatably journaled in any auxiliary frame 35 mounted in the main frame 1 (Figs. 3 and 5). Pinned to the shaft 33 is a bevel gear 36 which meshes with a bevel gear 37 pinned to a vertically disposed shaft 38 which is rotatably journaled in the frame 35. At its upper end, the shaft 38 is provided with a head 40 in which a pin 41 pivotally mounts the flap engaging finger 14. It will be noted that this pivotal axis of the finger 14 is disposed at right angles to the axis of rotation of the shaft 38. The purpose of this construction will presently appear.

The chains 8 are trained over a plurality of sprockets 43 and 44 mounted upon shafts 45 and 46, respectively. Fixed to one end of the shaft 45 is a pinion 47 which is operatively connected to the shaft 25 through the medium of a plurality of pinions 48, and a gear 49 secured to the shaft 25.

Referring now to the magazine 5, it will be noted that this part of the machine comprises a plurality of members adjustable relative to each other to accommodate envelopes of various sizes. Thus the magazine 5 preferably comprises a front wall or plate 50, side walls or plates 52 and 53, a bottom wall or plate 54, and an envelope supporting plate 55. The bottom plate 54 is preferably supported upon the main frame 1 and is adjustably secured thereto by screws 58 or the equivalent which project through slots 58 formed in the plate 54, the screws 57 being threaded into the main frame. This construction permits the plate 54 and, as will hereinafter appear, the remaining parts of the magazine 5, to be moved toward or away from the feed rolls 15 and 16. The front plate 50 is preferably rigidly secured to brackets 59 mounted upon and rigidly secured to the plate 54. The lower edges of the side plates 52 and 53 preferably rest upon the upper surface of the plate 54 and the side plates are preferably provided with brackets 60 having grooves 62 for accommodating the upper edge of the front plate 50. This permits the side plates 52 and 53 to be moved toward or away from each other, screws 63 being provided in the brackets 60 for securing the side plates to the front plate in any desired positions relative to each other. Mounted upon the inner surface of each of the side plates is a bar 65 which is adjustably secured to the side plate by bolts 67 or the equivalent passing through slots 68 formed in the side plate.

In practice, envelopes are positioned in the magazine 5 in such manner that they extend lengthwise between the side plates 52 and 53, the side plates being secured in positions in which they prevent undesirable lengthwise displacement of the envelopes. The bars 65 are adjusted to hold the upper edges of the envelopes in close proximity to the front plate 50. Of course, it is understood from the foregoing description that the envelopes are placed in the magazine 5 with their flap sides underneath so that the flaps may be engaged by the finger 14 and extended forwardly into engagement with the feed rolls 15 and 16.

A relatively large portion of the plate 54 is cut away, as indicated at 70, to accommodate the finger 14, the envelopes being supported by the plate 55 which is also cut away as at 72 to permit the flap of the lowermost envelope to be swung downwardly and then forwardly into engagement with the feed rolls 15 and 16. As best shown in Fig. 2, the plate 55 is preferably provided with a notch 74 so that the finger 14 may engage the back surface of the lowermost envelope behind the flap thereof.

To prevent accidental displacement of the plate 55 relative to the plate 54, I preferably provide a plurality of pins 76 projecting upward from the plate 54 adapted to engage apertures 77 formed in the plate 55. This arrangement permits the plate 55 to be readily removed from the magazine 5 when the magazine is to be adjusted for different sized envelopes. Thus, in Figs. 8 and 9 I have shown plates 55a and 55b, the plates 55a and 55b being provided with apertures 77 adapted to receive the pins 76. I prefer to provide a different envelope supporting plate for each different size of envelopes, as the operator will remember to change the envelope supporting plates when the magazine is being adjusted for a different sized envelope, but will not always remember to adjust the plate itself if it is made in two or more parts movable relative to each other.

Referring now to Figs. 3 to 7, inclusive, it will be noted that the flap engaging finger 14 preferably comprises a bent wire 79 which projects from a member 80, the aforementioned pin 41 being passed through the member 80 to pivot the flap engaging finger in the head 40 of the shaft 38. Journaled upon the member 80 is a roller 81 held against longitudinal displacement by a shoulder 82 formed upon the member 80 and by a cotter pin 83 projecting through the member 80. The roller 81 is adapted to ride upon a cam 85 adjustably secured to the bracket 35, the roller being urged against the cam by a leaf spring 87 which has one end clamped to the head 40 by a plate 88 and screws 89. The free end of the leaf spring 87 bears upon the outer end of the member 80 and tends to rotate the flap engaging finger 14 in a clockwise direction (Fig. 6) around the pin 41. The cam is preferably provided with a flat dwell 90 and a depression 91 and is so designed that when the roller 81 rides upon the dwell 90 the finger 14 will have its flap engaging end disposed beneath the plate 54. However, when the roller 81 falls into the depression 91, the flap engaging end of the finger 14 will move upwardly through the notch 74 in the plate 55 and will engage the back surface of the lowermost envelope behind the flap portion thereof. Then as the finger tends to rotate around the axis of rotation of the shaft 38, the finger will engage the flap of the lowermost envelope and extend it forwardly into a position wherein it may be engaged by the feed rolls 15 and 16, it being understood that the shaft 38 is continuously rotated when the machine is in operation.

Any suitable means may be provided for adjustably securing the cam 85 to the frame 35, but I preferably provide a screw 94 or the equivalent which passes through an aperture 95 formed in the cam and which is adapted to be threaded into any one of a plurality of holes 96, 97, and 98 formed in the frame 35. This permits the cam to be quickly and easily adjusted for various sized flaps. Thus, each time the plate 55 is replaced by a like plate of different dimensions it is preferable to adjust the cam 85 so that the finger 14 will properly engage the flaps of the envelopes disposed in the magazine. Obviously, a desired number of plates adapted to be used in place of the plates 55, 55a, and 55b, may be provided and any desired number of tapped holes resembling the tapped holes 96, 97 and 98 may be provided in the frame 35.

It is preferable to adjust the magazine 5 as a unit relative to the feed rolls 15 and 16 for envelopes of different sizes, for if the magazine is positioned for envelopes having relatively long flaps which are extended to the feed rolls 15 and 16 by the finger 14 and an attempt is made to feed envelopes having relatively short flaps, the finger 14 will be unable to extend the flaps thereof into positions wherein they may be engaged by the feed rolls 15 and 16. The magazine may be adjusted as a unit relative to the feed rolls 15 and 16 by manipulating the aforementioned screws 57 and then pushing the envelope toward or away from the feed rolls 15 and 16, as the case may be, after which the screws 57 are again tightened.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In envelope feeding apparatus, envelope advancing means, a magazine, means associated with said magazine for extending the flaps of envelopes into engagement with said advancing means, said flap extending means comprising a flap engaging finger, means for moving said finger, and means for varying the functional operative position of said finger.

2. In envelope feeding apparatus, envelope advancing means, a magazine, means associated with said magazine for extending the flaps of envelopes into engagement with said advancing means, said flap extending means comprising a flap engaging finger, means for rotating said flap engaging finger, and means for tilting said finger, said means providing an element of means for varying the functional operative position of said finger.

3. In envelope feeding apparatus, envelope advancing means, a magazine, means associated with said magazine for extending the flaps of envelopes into engagement with said advancing means, said flap extending means comprising a flap engaging finger, means for rotating said flap engaging finger, a cam for periodically tilting said finger, said cam providing an element of means for varying the functional operative position of said finger.

4. In envelope feeding apparatus, envelope advancing means, a magazine, means associated with said magazine for extending the flaps of envelopes into engagement with said advancing means, said flap extending means comprising a flap engaging finger, means for rotating said flap engaging finger, adjustable means for tilting said finger in a plane normal to its axis of rotation, said adjustable means providing an element of means for varying the functional operative position of said finger and means for supporting a plurality of envelopes, said means being adjustable for accommodating envelopes of different sizes.

5. In envelope feeding apparatus, envelope advancing means, a magazine, means associated with said magazine for extending the flaps of envelopes into engagement with said advancing means, said flap extending means comprising a flap engaging finger, means for rotating said flap engaging finger, a cam for periodically tilting said finger, means for securing said cam in a plurality of adjusted positions, a bed plate carried by said magazine, and a feed plate replaceably supported by said bed plate for accommodating envelopes of different sizes.

6. In envelope feeding apparatus, envelope advancing means, a magazine, means associated with said magazine for extending the flaps of envelopes into engagement with said advancing means, said flap extending means comprising a flap engaging finger, means for rotating said flap engaging finger, adjustable means for tilting said finger in a plane normal to its axis of rotation, a plate carried by said magazine, and a feed plate replaceably supported by said bed plate for accommodating envelopes of different sizes.

7. In an apparatus of the kind described, the combination of envelope advancing means and means associated with said advancing means for extending the flaps of envelopes into engagement with said advancing means, said means for extending said flaps including means for varying the functionally operative position of said flap extending means.

8. In a device for extending the flaps of envelopes, said device including means rotatable into engagement with said flaps, and means for varying the functionally operative position of said rotatable means.

9. In envelope feeding apparatus, envelope advancing means, a magazine, means associated with said magazine for extending the flaps of envelopes into engagement with said advancing means, said flap extending means comprising a flap engaging finger, means for moving said finger and means for varying the position at which said finger engages the flap.

In testimony whereof, I have hereunto signed my name.

CLAUDE L. POST.